United States Patent
Kojima (10) Patent No.: US 9,146,302 B2
(45) Date of Patent: Sep. 29, 2015

(54) DISTURBANCE SIGNAL REMOVING DEVICE, RADAR APPARATUS AND METHOD OF REMOVING DISTURBANCE SIGNAL

(75) Inventor: Tatsuya Kojima, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 487 days.

(21) Appl. No.: 13/492,535

(22) Filed: Jun. 8, 2012

(65) Prior Publication Data

US 2012/0313814 A1     Dec. 13, 2012

(30) Foreign Application Priority Data

Jun. 10, 2011  (JP) .................................. 2011-130202

(51) Int. Cl.
| | | |
|---|---|---|
| G01S 13/00 | (2006.01) | |
| G01S 7/02 | (2006.01) | |
| G01S 13/24 | (2006.01) | |
| G01S 13/28 | (2006.01) | |
| G01S 7/36 | (2006.01) | |

(52) U.S. Cl.
CPC ................. *G01S 7/023* (2013.01); *G01S 13/24* (2013.01); *G01S 13/28* (2013.01); *G01S 7/36* (2013.01)

(58) Field of Classification Search
CPC ........... G01S 7/36; G01S 7/023; G01S 13/24; G01S 13/28
USPC ......................................................... 342/201
See application file for complete search history.

(56) References Cited

U.S. PATENT DOCUMENTS

| | | | |
|---|---|---|---|
| 2007/0229349 A1* | 10/2007 | Kajio et al. ...................... | 342/82 |
| 2008/0122684 A1* | 5/2008 | Nakahama et al. ............ | 342/179 |
| 2008/0284638 A1* | 11/2008 | Kajio et al. ...................... | 342/59 |

FOREIGN PATENT DOCUMENTS

JP     2008-96337 A     4/2008

* cited by examiner

*Primary Examiner* — Frank J McGue
(74) *Attorney, Agent, or Firm* — Global IP Counselors, LLP (57) ABSTRACT

A disturbance signal removing device is provided. The device includes an antenna for transmitting a modulated pulse signal and a non-modulated pulse signal, and a transmission frequency setter for selectively setting as a transmission frequency band of the modulated pulse signal any one of a plurality of mutually different frequency bands of the modulated pulse signal that are different from a transmission frequency band set to the non-modulated pulse signal. The transmission frequency setter switches between the plurality of transmission frequency bands of the modulated pulse signal.

19 Claims, 9 Drawing Sheets

| | | | | | | | | | | | | | | | | |
|---|---|---|---|---|---|---|---|---|---|---|---|---|---|---|---|---|
| (a) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 0 | 1 | 0 | 1 | 1 | 1 | 0 | 0 | 0 | 1 | 0 | 1 | 1 | 1 | 0 | 0 | ... |
| | COINCIDENCE OF BAND | ✓ | ✓ | ✓ | ✓ | ✓ | ✓ | ✓ | ✓ | ✓ | ✓ | ✓ | ✓ | ✓ | ✓ | ✓ | ✓ | |

| | | | | | | | | | | | | | | | | |
|---|---|---|---|---|---|---|---|---|---|---|---|---|---|---|---|---|
| (b) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 0 | 0 | 1 | 0 | 1 | 1 | 1 | 0 | 0 | 0 | 1 | 0 | 1 | 1 | 1 | 0 | ... |
| | COINCIDENCE OF BAND | ✓ | | | | ✓ | ✓ | | ✓ | ✓ | | | | ✓ | ✓ | | ✓ | |

| | | | | | | | | | | | | | | | | |
|---|---|---|---|---|---|---|---|---|---|---|---|---|---|---|---|---|
| (c) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 0 | 0 | 0 | 1 | 0 | 1 | 1 | 1 | 0 | 0 | 0 | 1 | 0 | 1 | 1 | 1 | ... |
| | COINCIDENCE OF BAND | ✓ | | ✓ | ✓ | | ✓ | | | ✓ | | ✓ | ✓ | | ✓ | | | |

| | | | | | | | | | | | | | | | | |
|---|---|---|---|---|---|---|---|---|---|---|---|---|---|---|---|---|
| (d) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 1 | 0 | 0 | 0 | 1 | 0 | 1 | 1 | 1 | 0 | 0 | 0 | 1 | 0 | 1 | 1 | ... |
| | COINCIDENCE OF BAND | | | ✓ | | ✓ | | | | | | ✓ | | ✓ | | | | |

| | | | | | | | | | | | | | | | | |
|---|---|---|---|---|---|---|---|---|---|---|---|---|---|---|---|---|
| (e) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 1 | 1 | 0 | 0 | 0 | 1 | 0 | 1 | 1 | 1 | 0 | 0 | 0 | 1 | 0 | 1 | ... |
| | COINCIDENCE OF BAND | | ✓ | ✓ | | ✓ | ✓ | | | ✓ | ✓ | | | ✓ | ✓ | | | |

| | | | | | | | | | | | | | | | | |
|---|---|---|---|---|---|---|---|---|---|---|---|---|---|---|---|---|
| (f) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 1 | 1 | 1 | 0 | 0 | 0 | 1 | 0 | 1 | 1 | 1 | 0 | 0 | 0 | 1 | 0 | ... |
| | COINCIDENCE OF BAND | | ✓ | | | | | ✓ | ✓ | | | | | | | | ✓ | |

| | | | | | | | | | | | | | | | | |
|---|---|---|---|---|---|---|---|---|---|---|---|---|---|---|---|---|
| (g) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 0 | 1 | 1 | 1 | 0 | 0 | 0 | 1 | 0 | 1 | 1 | 1 | 0 | 0 | 0 | 1 | ... |
| | COINCIDENCE OF BAND | ✓ | ✓ | | ✓ | | | ✓ | | ✓ | ✓ | | ✓ | | | ✓ | | |

| | | | | | | | | | | | | | | | | |
|---|---|---|---|---|---|---|---|---|---|---|---|---|---|---|---|---|
| (h) | RADAR TX BAND | 0 | 1 | 0 | 1 | 1 | 1 | 0 | 0 | 0 | 1 | 0 | 1 | 1 | 1 | 0 | 0 | ... |
| | ANOTHER RADAR TX BAND | 1 | 0 | 1 | 1 | 1 | 0 | 0 | 0 | 1 | 0 | 1 | 1 | 1 | 0 | 0 | 0 | ... |
| | COINCIDENCE OF BAND | | | ✓ | ✓ | ✓ | ✓ | | | ✓ | | ✓ | ✓ | | | ✓ | ✓ | |

← ONE CYCLE OF TRANSMISSION FREQUENCY BAND PATTERN → ← ONE CYCLE OF TRANSMISSION FREQUENCY BAND PATTERN → TIME

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (a) | ANOTHER RADAR TX BAND | 1 | 0 | 0 | 1 | 1 | 1 | 0 | 0 | 0 | 0 | 1 | 0 | 1 | 1 | 0 | ... |
| | COINCIDENCE OF BAND | ✓ | ✓ | ✓ | ✓ | ✓ | ✓ | ✓ | ✓ | ✓ | ✓ | ✓ | ✓ | ✓ | ✓ | ✓ | |

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (b) | ANOTHER RADAR TX BAND | 0 | 1 | 0 | 0 | 1 | 1 | 1 | 0 | 0 | 0 | 0 | 1 | 0 | 1 | 1 | ... |
| | COINCIDENCE OF BAND | | | ✓ | | ✓ | ✓ | ✓ | | ✓ | ✓ | ✓ | | | | ✓ | |

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (c) | ANOTHER RADAR TX BAND | 1 | 0 | 1 | 0 | 0 | 1 | 1 | 1 | 0 | 0 | 0 | 0 | 1 | 0 | 1 | ... |
| | COINCIDENCE OF BAND | ✓ | ✓ | | | | ✓ | ✓ | | | ✓ | ✓ | | ✓ | ✓ | | |

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (d) | ANOTHER RADAR TX BAND | 1 | 1 | 0 | 1 | 0 | 0 | 1 | 1 | 1 | 0 | 0 | 0 | 0 | 1 | 0 | ... |
| | COINCIDENCE OF BAND | ✓ | | ✓ | ✓ | | ✓ | | | | ✓ | | ✓ | | ✓ | ✓ | |

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (e) | ANOTHER RADAR TX BAND | 0 | 1 | 1 | 0 | 1 | 0 | 0 | 1 | 1 | 1 | 0 | 0 | 0 | 0 | 1 | ... |
| | COINCIDENCE OF BAND | | | | | ✓ | | | | | | | ✓ | | | | |

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (f) | ANOTHER RADAR TX BAND | 1 | 0 | 1 | 1 | 0 | 1 | 0 | 0 | 1 | 1 | 1 | 0 | 0 | 0 | 0 | ... |
| | COINCIDENCE OF BAND | ✓ | ✓ | | ✓ | | ✓ | ✓ | ✓ | | | ✓ | ✓ | | | ✓ | |

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (g) | ANOTHER RADAR TX BAND | 0 | 1 | 0 | 1 | 1 | 0 | 1 | 0 | 0 | 1 | 1 | 1 | 0 | 0 | 0 | ... |
| | COINCIDENCE OF BAND | | | ✓ | ✓ | ✓ | | ✓ | ✓ | ✓ | | ✓ | | | | ✓ | |

| | RADAR TX BAND | 1 | 0 | 0 | 1 | 1 | 1 | 0 | 0 | 0 | 0 | 1 | 0 | 1 | 1 | 0 | |
|---|---|---|---|---|---|---|---|---|---|---|---|---|---|---|---|---|---|
| (h) | ANOTHER RADAR TX BAND | 0 | 0 | 1 | 0 | 1 | 1 | 0 | 1 | 0 | 0 | 1 | 1 | 1 | 0 | 0 | ... |
| | COINCIDENCE OF BAND | | ✓ | | ✓ | ✓ | | ✓ | ✓ | | ✓ | | ✓ | | ✓ | | |

ONE CYCLE OF TRANSMISSION FREQUENCY BAND PATTERN → TIME

FIG. 6

| | | | | | | | | | | | | | | | |
|---|---|---|---|---|---|---|---|---|---|---|---|---|---|---|---|
| (a) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 0 | 0 | 0 | 1 | 0 | 1 | 1 | 0 | 1 | 0 | 0 | 1 | 1 | 1 | 0 |
| | COINCIDENCE OF BAND | | ✓ | ✓ | ✓ | | ✓ | ✓ | ✓ | | ✓ | ✓ | ✓ | | ✓ | ✓ | ✓ |

| | | | | | | | | | | | | | | | |
|---|---|---|---|---|---|---|---|---|---|---|---|---|---|---|---|
| (b) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 0 | 0 | 0 | 0 | 1 | 0 | 1 | 1 | 0 | 1 | 0 | 0 | 1 | 1 | 1 |
| | COINCIDENCE OF BAND | | ✓ | ✓ | | ✓ | | ✓ | | ✓ | | | ✓ | | ✓ | ✓ |

| | | | | | | | | | | | | | | | |
|---|---|---|---|---|---|---|---|---|---|---|---|---|---|---|---|
| (c) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 1 | 0 | 0 | 0 | 0 | 1 | 0 | 1 | 1 | 0 | 1 | 0 | 0 | 1 | 1 |
| | COINCIDENCE OF BAND | ✓ | ✓ | ✓ | | ✓ | | | ✓ | | | ✓ | | | ✓ | ✓ |

| | | | | | | | | | | | | | | | |
|---|---|---|---|---|---|---|---|---|---|---|---|---|---|---|---|
| (d) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 1 | 1 | 0 | 0 | 0 | 0 | 1 | 0 | 1 | 1 | 0 | 1 | 0 | 0 | 1 | 1 |
| | COINCIDENCE OF BAND | ✓ | | ✓ | | | | ✓ | ✓ | | ✓ | | ✓ | ✓ | | | ✓ |

| | | | | | | | | | | | | | | | |
|---|---|---|---|---|---|---|---|---|---|---|---|---|---|---|---|
| (e) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 1 | 1 | 1 | 0 | 0 | 0 | 0 | 1 | 0 | 1 | 1 | 0 | 1 | 0 | 0 | 1 |
| | COINCIDENCE OF BAND | ✓ | | | | | | | ✓ | | | ✓ | | | | | |

| | | | | | | | | | | | | | | | |
|---|---|---|---|---|---|---|---|---|---|---|---|---|---|---|---|
| (f) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 1 | 1 | 1 | 1 | 0 | 0 | 0 | 0 | 1 | 0 | 1 | 1 | 0 | 1 | 0 | 0 |
| | COINCIDENCE OF BAND | ✓ | | | ✓ | | | | ✓ | | ✓ | | ✓ | ✓ | ✓ | | ✓ |

| | | | | | | | | | | | | | | | |
|---|---|---|---|---|---|---|---|---|---|---|---|---|---|---|---|
| (g) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 0 | 1 | 1 | 1 | 1 | 0 | 0 | 0 | 0 | 1 | 0 | 1 | 1 | 0 | 1 | 0 |
| | COINCIDENCE OF BAND | | | | ✓ | ✓ | | ✓ | ✓ | | ✓ | ✓ | | | ✓ | ✓ |

| | | | | | | | | | | | | | | | |
|---|---|---|---|---|---|---|---|---|---|---|---|---|---|---|---|
| (h) | RADAR TX BAND | 1 | 0 | 0 | 1 | 1 | 1 | 1 | 0 | 0 | 0 | 1 | 0 | 1 | 1 | 0 |
| | ANOTHER RADAR TX BAND | 0 | 0 | 1 | 1 | 1 | 1 | 0 | 0 | 0 | 0 | 1 | 0 | 1 | 1 | 0 | 1 |
| | COINCIDENCE OF BAND | | ✓ | | ✓ | ✓ | ✓ | | ✓ | ✓ | ✓ | | ✓ | | | ✓ |

← ONE CYCLE OF TRANSMISSION FREQUENCY BAND PATTERN → TIME

DISTURBANCE SIGNAL REMOVING DEVICE, RADAR APPARATUS AND METHOD OF REMOVING DISTURBANCE SIGNAL

CROSS-REFERENCE TO RELATED APPLICATION(S)

The application claims priority under 35 U.S.C.§119 to Japanese Patent Application No. 2011-130202, which was filed on Jun. 10, 2011, the entire disclosure of which is hereby incorporated by reference.

TECHNICAL FIELD

The present invention generally relates to a disturbance signal removing device, a radar apparatus equipped with the disturbance signal removing device, and a method of removing disturbance signal.

BACKGROUND OF THE INVENTION

Typically, radar apparatuses, e.g., mounted on a ship, are configured so as to transmit a pulse-shaped transmission signal from a rotating antenna and receive an echo signal from a target object, such as another ship. With this configuration, a distance to the target object can be detected by measuring a time length after transmitting the transmission signal until receiving the echo signal. Since the antenna performs the transmission of the transmission signal and the reception of the echo signal while rotating, the radar apparatus can detect target objects in arbitrary directions.

Such a radar apparatus may receive transmission signals from other radar apparatuses (typically, mounted on other ships) and, thus, those transmission signals may interfere with echo signals, degrading performance of the radar apparatus. Therefore, for such a type of radar apparatus, various techniques to remove the transmission signals from other radar apparatuses (i.e., interference signals) have been proposed.

Figure 9A:
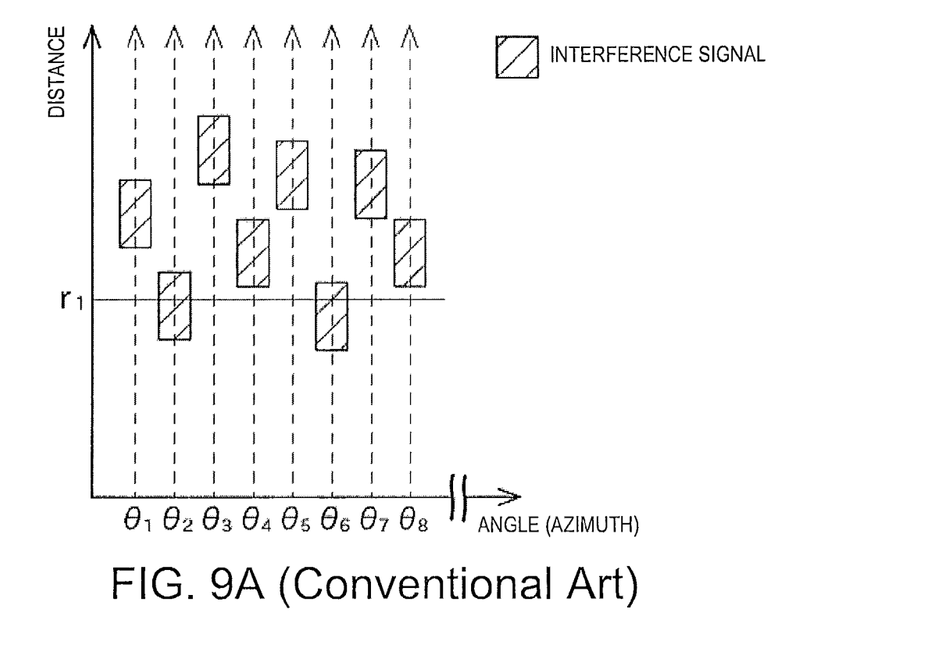
FIGS. 9A and 9B are graphs illustrating conventional methods of removing interference signals.
Figure 9B:
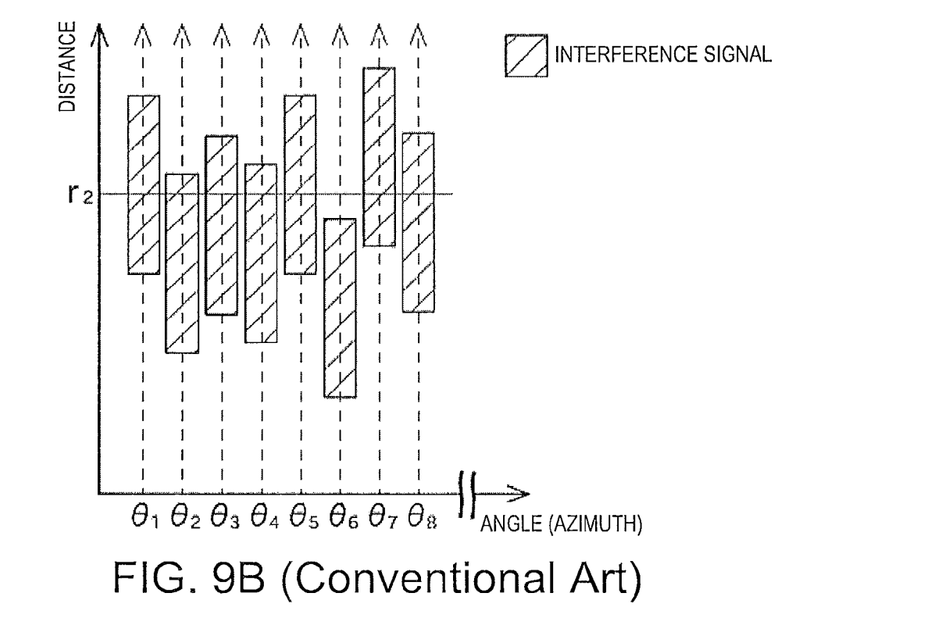

Example processing of the radar apparatus for removing the interference signals is described with reference to FIGS. 9A and 9B. FIGS. 9A and 9B are graphs showing conventional interference removing processes. In FIGS. 9A and 9B, a vertical axis shows a distance from the radar apparatus, and a horizontal axis shows an azimuth when transmitting a transmission signal. The azimuth is indicated using a horizontal angle with respect to a predetermined bearing. Dashed lines parallel to the vertical axis indicate reception data for one sweep, each corresponds to the azimuth (i.e., an angle $\theta_n$), and a bar with a hatched area which overlaps with the corresponding dashed line indicates an interference signal, respectively.

The radar apparatus performs, as processing for removing the interference signals, processing for changing a time interval for transmitting the transmission signal (i.e., a transmission cycle) each time it transmits the transmission signal. Thus, the radar apparatus receives the echo signals at timings corresponding to the transmission time intervals which are individually set to the radar apparatus. Contrary, the radar apparatus receives the interference signals from other radar apparatuses at different timings which correspond to transmission time intervals individually set to the other radar apparatuses. For this reason, the receiving timings of the necessary echo signals and the unnecessary interference signals will never have a fixed relation therebetween, and, therefore, the interference signals which the radar apparatus receives appear at random locations in the distance direction, as shown in FIG. 9A.

Note that, since the echo signals are reflection waves, their signal intensities are comparatively low; however, since the interference signals are received directly from other radar apparatuses, their signal intensities are comparatively high. Using this tendency, the interference signals can be removed by comparing reception data of one sweep with reception data of a previous or later sweep at the same distance, and using reception data with a lower signal intensity as an output value of the sweep of interest. For example, in FIG. 9A, when a total of three sweeps at angles $\theta_1$, $\theta_2$ and $\theta_3$ are observed, signal intensities of the reception data of the sweeps at the angles $\theta_1$ and $\theta_3$ are low near a distance $r_1$, as compared with the reception data at the angle $\theta_2$. Therefore, as for the range near the distance r1, the interference signals can be removed by using the reception data of the sweep at the angle $\theta_1$ or the angle $\theta_3$ as an output value of the sweep at the angle $\theta_2$.

In recent years, the pulse compression radar apparatuses which transmit a modulated pulse signal using a semiconductor amplifier alternatively or additionally to a magnetron has just begun to be put in practical use for ship radars (see JP2008-96337A). The pulse compression radar apparatus transmits a transmission signal having a considerably long time width (i.e., a long pulse width) compared to the radar apparatus just using the magnetron. Then, by filtering the echo signals in accordance with the transmission signals, the pulse widths of the echo signals can be compressed and a signal-to-noise power ratio (i.e., S/N ratio) can be improved.

However, when filtering interference signals from other pulse compression radar apparatuses (i.e., signals with long pulse widths), pulse widths of the interference signals will not be compressed if modulation modes of the interference signals of other radar apparatuses differ from a modulation mode of the transmission signals of the radar apparatus of interest. Moreover, when filtering interference signals from other radar apparatuses using the magnetron (i.e., signals with short pulse widths), pulse widths of the interference signals will be large. In other words, when the pulse compression radar apparatus receives the interference signals, the interference signals appear to be elongated in the distance direction, as shown in FIG. 9B.

Therefore, it may be said that, regardless of changing the transmission time interval of the transmission signal such that the interference signals differ from each other in the distance direction, when the reception data are compared at the same distance, as described above, the interference signals continue over many sweeps in the azimuth direction (e.g., five sweeps from the angle $\theta_1$ to the angle $\theta_5$ near at a distance $r_2$, as shown in FIG. 9B). As for this case, the interference signals cannot be properly removed by using the method of extracting about three adjacent sweeps and simply measuring the intensities of the signals. Thus, in the conventional pulse compression radar apparatus, it is difficult to remove the interference signals by a simple comparison of the signal intensities between sweeps.

SUMMARY OF THE INVENTION

The present invention is made in view of the above situation, and provides a disturbance signal removing device capable of sufficiently removing disturbance signals (or interference signals), and particularly to a pulse compression radar apparatus capable of sufficiently removing the interference signals from other radar apparatuses. The invention also provides a method of removing the disturbance signals.

According to one aspect of the invention, a disturbance signal removing device is provided, which includes an antenna for transmitting a modulated pulse signal and a non-modulated pulse signal, and a transmission frequency setter for selectively setting as a transmission frequency band of the modulated pulse signal any one of a plurality of mutually different frequency bands of the modulated pulse signal that are different from a transmission frequency band set to the non-modulated pulse signal. The transmission frequency setter switches between the transmission frequency bands of the modulated pulse signal.

Thus, the disturbance signal removing device can transmit the modulated pulse signals, while changing the transmission frequency band. Therefore, the transmission frequency bands of the modulated pulse signals of this device will be difficult to be in agreement with transmission frequency bands of the transmission signals of another device which does not perform the changing of the transmission frequency band. As a result, the transmission signals (i.e., interference or disturbance signals) received from another device can easily be removed.

The transmission frequency setter may switch the transmission frequency band of the modulated pulse signal based on a predetermined transmission frequency band pattern.

Thus, the transmission frequency band of the modulated pulse signal can be switched with such a simple configuration.

The transmission frequency setter may randomly select the transmission frequency band of the modulated pulse signal for every transmission.

Thus, it can prevent that the transmission frequency bands of the modulated pulse signals continue being in agreement with transmission frequency bands of the transmission signals of another device.

The transmission frequency setter may set a first transmission frequency band higher than a predetermined frequency band and a second transmission frequency band lower than the predetermined frequency band as the transmission frequency band for the modulated pulse signal.

Thus, it can prevent that the transmission frequency bands of the modulated pulse signals will be in agreement with transmission frequency bands of the interference signals where the predetermined frequency is set as the transmission frequency band. Therefore, interference signals from another device where the frequency is set as the transmission frequency band can be removed.

A band between the first transmission frequency band and the second transmission frequency band may include 9410 MHz.

Thus, a band typically used in a ship radar apparatus can be avoided. Therefore, interference signals from the ship radar apparatus can be removed.

The transmission frequency setter may alternately set the transmission frequency band of the modulated pulse signal and the transmission frequency band of the non-modulated pulse signal.

Since the non-modulated pulse signal and the modulated pulse signal are transmitted with sufficient balance, the disturbance signal removing device can appropriately acquire data about a target object.

The transmission frequency setter may set any of two mutually different frequency bands as the transmission frequency band of the modulated pulse signal. The non-modulated pulse signal and the modulated pulse signal may alternately be transmitted. The transmission frequency setter may switch the transmission frequency band of the modulated pulse signal from one of the two frequency bands to the other.

Thus, it can be made difficult to be in agreement with the transmission frequency bands of another device which does not change the transmission frequency band, while transmitting the pulse non-modulated and the modulated pulse with sufficient balance.

The predetermined transmission frequency band pattern may be defined such that the predetermined transmission frequency band pattern has one cycle containing transmission frequency bands for N transmissions of the modulated pulse signal, and when the predetermined transmission frequency band pattern is compared with a comparison transmission frequency band pattern of which a timing is shifted from the predetermined transmission frequency band by one to N−1 transmissions, the number of continuous coincidences of the transmission frequency bands is a minimum value.

Even when another device using the same transmission frequency band pattern exists, the bands of the transmission signals are seldom continuously in agreement between the devices. Therefore, the interference signals from another device can easily be removed by such a simple method (e.g., an intensity comparison of the reception data of continuous sweeps).

The transmission frequency setter may change a timing at which the predetermined transmission frequency band pattern is applied based on a signal inputted from an external device.

If another device uses the same transmission frequency band pattern as the disturbance signal removing device of interest, the same transmission frequency bands may continue being mutually set at similar timings. In this case, it is difficult to remove the interference signals from another device. In this regard, since the timing at which the transmission frequency band pattern is applied by an external signal (e.g., a signal outputted in response to an operation by a user) can be positively changed, it can prevent that the same transmission frequency bands continue being set at similar timings between the disturbance signal removing device of interest and another device. Therefore, the interference signals from another device can be removed.

The transmission frequency setter may change a timing at which the predetermined transmission frequency band pattern is applied based on a detection result of a detector for detecting a difference between a timing at which the transmission frequency band pattern is applied in the disturbance signal removing device and a timing at which a transmission frequency band pattern is applied in another disturbance signal removing device.

Thus, it can prevent that the same transmission frequency bands continue being set at similar timings between the disturbance signal removing device of interest and another device. Further, with this configuration, since the difference of timing at which the transmission frequency band pattern is applied can be detected by the detector, time and effort of the user carrying out observation and operation can be reduced.

A transmission interval of the modulated pulse signal may be switched.

Thus, since the timings at which the interference signals are received become irregular, the interference signals can be removed more appropriately.

The disturbance signal removing device may be carried in a ship.

Thus, the above effects can also be achieve in a ship radar apparatus.

According to another aspect of the invention, a radar apparatus is provided, which includes a transmission frequency setter for selectively setting, to a transmission frequency band of a modulated pulse signal, any one of a plurality of mutually different frequency bands different from a transmission frequency band set to a non-modulated pulse signal, an antenna for transmitting the modulated pulse signal and the non-modulated pulse signal while the transmission frequency setter switches the transmission frequency band of the modulated pulse signal, and receiving a reception signal caused by a reflection from a target object, a reception signal processor for generating a radar image indicative of a position of the target object around the radar device based on the reception signal received by the antenna, and a display control unit for displaying the radar image on an external display device.

Thus, the radar apparatus can transmit the modulated pulse signals, while changing the transmission frequency band. Therefore, the transmission frequency bands of the modulated pulse signals of this radar apparatus becomes difficult to be in agreement with interference signals caused by another radar apparatus which does not perform the changing of the transmission frequency band. Therefore, the interference signals can easily be removed.

According to still another aspect of the invention, a method of removing a disturbance signal is provided, which includes selectively setting, to a transmission frequency band of a modulated pulse signal, any one of a plurality of mutually different frequency bands different from a transmission frequency band set to a non-modulated pulse signal, and transmitting the modulated pulse signal, while switching the transmission frequency band.

By performing this method, the modulated pulse signals can be transmitted, while changing the transmission frequency band. Thus, the transmission frequency bands of the modulated pulse signals are difficult to be in agreement with interference signals caused by another radar apparatus which does not perform the changing of the transmission frequency band. Therefore, the interference signals can easily be removed.

The transmission frequency band of the modulated pulse signal may be switched based on a predetermined transmission frequency band pattern.

By performing this method, even when another device using a similar transmission frequency band pattern exists, the bands of the transmission signals will not be continuously in agreement so much between the devices. Therefore, the interference signals from another device can easily be removed by such a simple method.

A first transmission frequency band higher than a predetermined frequency band a second transmission frequency band lower than the predetermined frequency band may be set to the modulated pulse signal as the transmission frequency band for the modulated pulse signal.

By performing this method, it can prevent that the transmission frequency bands of the modulated pulse signals will be in agreement with a transmission frequency band of the interference signal where the predetermined frequency is set as the transmission frequency band. Therefore, the interference signals from another device can be removed.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
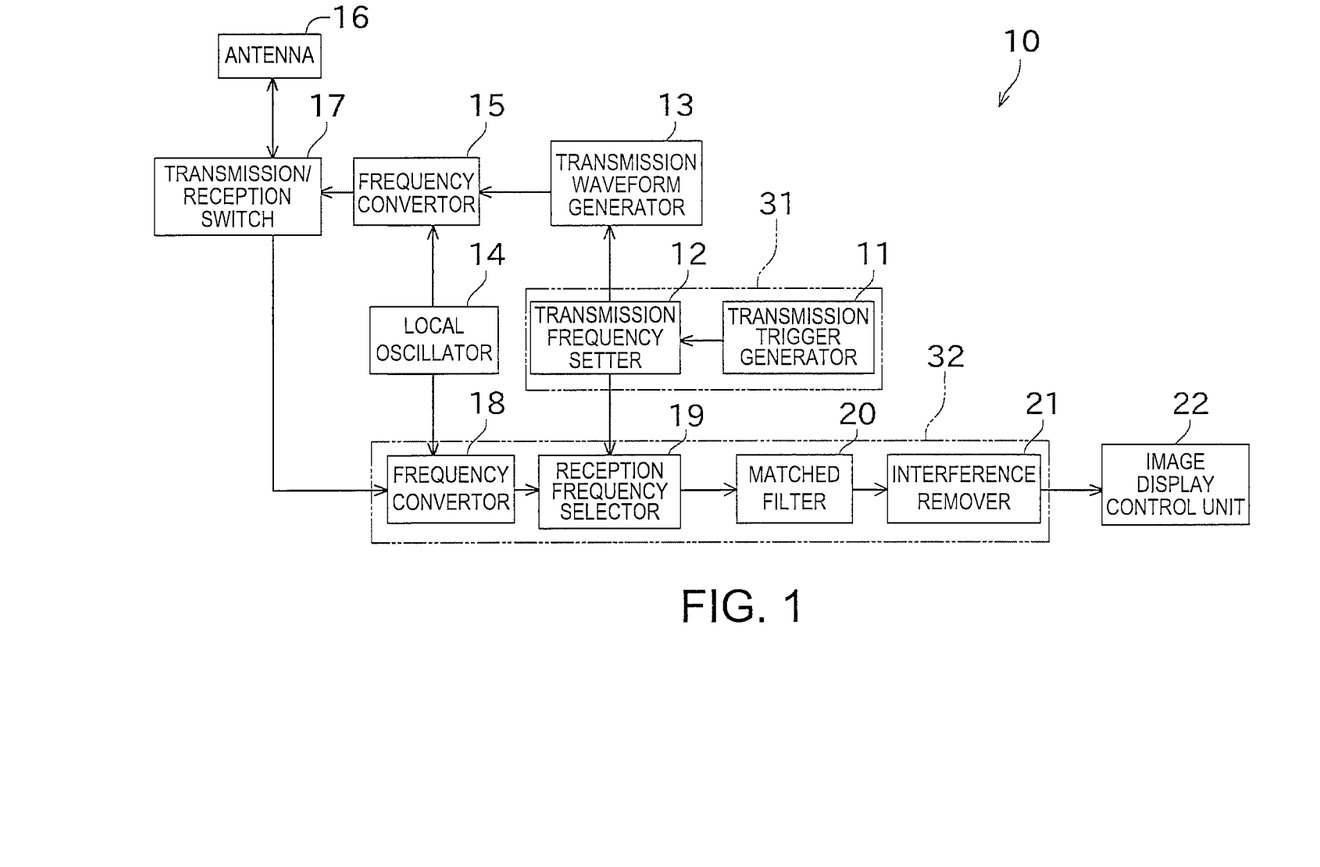
FIG. 1 is a block diagram showing a configuration of a pulse compression radar apparatus according to one embodiment of the present invention.
Figure 2:
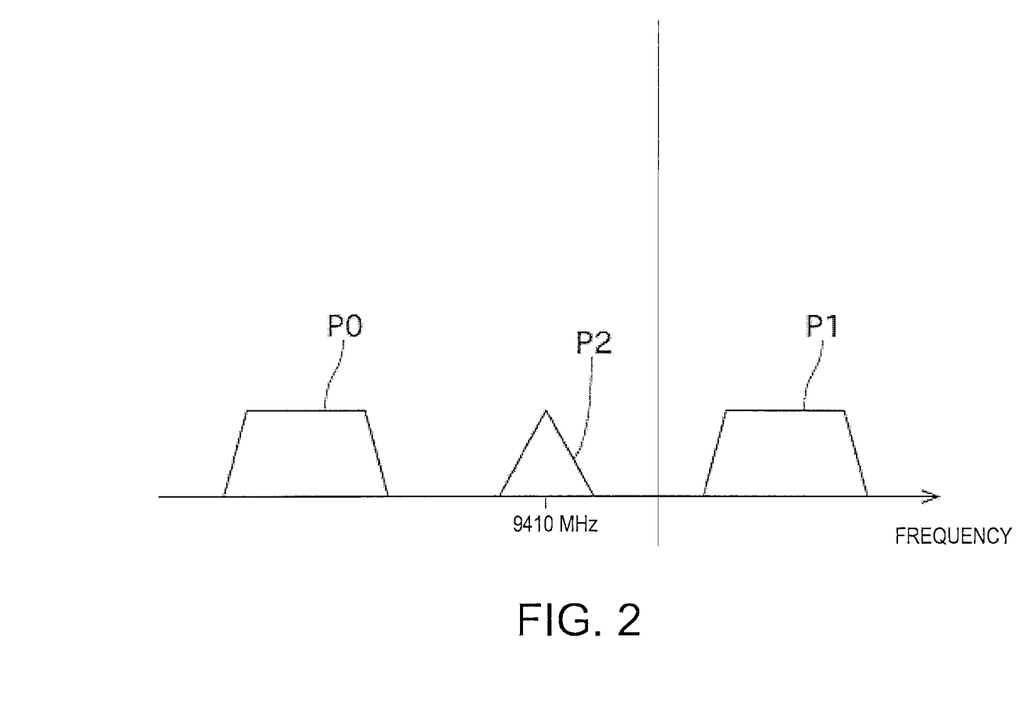
FIG. 2 is a schematic diagram illustrating some types of pulse signals transmitted from the pulse compression radar apparatus.
Figure 3A:
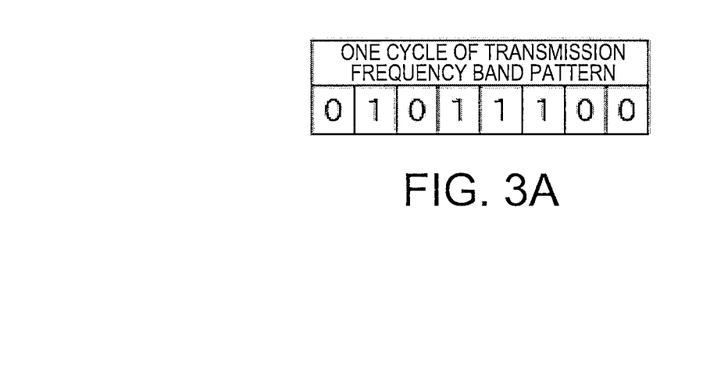
FIGS. 3A is a diagram showing a transmission frequency band pattern.
Figure 3B:
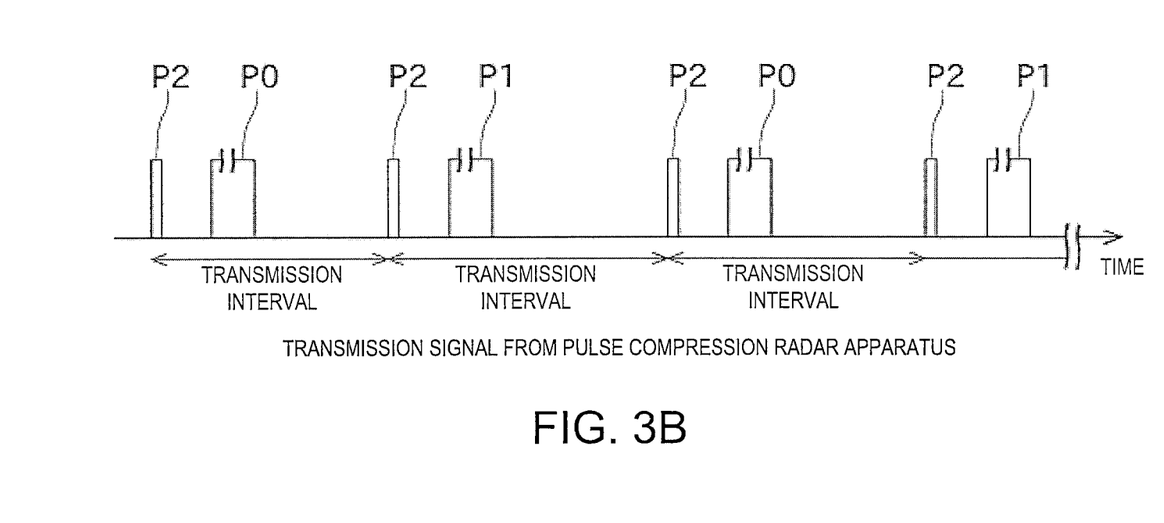
FIG. 3B is a schematic diagram showing a series of transmission signals transmitted from the pulse compression radar apparatus in accordance with the transmission frequency band pattern.

Hereinafter, one embodiment of the present invention is described with reference to the accompanying drawings. With reference to FIGS. 1 to 3, an entire configuration of a pulse compression radar apparatus 10 of this embodiment is first described. FIG. 1 is a block diagram showing a configuration of the pulse compression radar apparatus 10. FIG. 2 is a schematic diagram illustrating some types of pulse signals transmitted from the pulse compression radar apparatus 10. FIGS. 3A shows a transmission frequency band pattern, and FIG. 3B is a schematic diagram showing transmission signals transmitted from the pulse compression radar apparatus 10 in accordance with the transmission frequency band pattern.

The pulse compression radar apparatus 10 is configured as a ship radar apparatus in this embodiment. The pulse compression radar apparatus 10 transmits a pulse-shaped transmission signal and receives, as an echo signal, a reflection wave from a target object (e.g., land, another surface ship, etc.) around a ship which equips the apparatus 10 (hereinafter, may be simply referred to as "the ship"). Then, the pulse compression radar apparatus 10 displays a position and a shape of the target object, as a radar image, on an external display device based on the echo signal.

In addition to the echo signal, the pulse compression radar apparatus 10 may receive one or more transmission signals from one or more other radar apparatuses (e.g., from pulse compression radar apparatuses typically carried in other ships). These transmission signals from other radar apparatuses (hereinafter, referred to as "the interference signals" or "disturbance signals") will cause a disorder in the radar image. For this reason, even when the interference signals are received, in order to remove the interference signals, the pulse compression radar apparatus 10 is configured to perform the following processing. Note that a signal which the pulse compression radar apparatus 10 received (typically containing the echo signal as well as the interference signal(s)) is referred to as "the reception signal."

The pulse compression radar apparatus 10 include a transmission trigger generator 11, a transmission frequency setter 12, a transmission waveform generator 13, a local oscillator 14, a frequency convertor 15, an antenna 16, and a transmission/reception switch 17, for transmitting the transmission signal. Note that the transmission trigger generator 11 and the transmission frequency setter 12 constitute a disturbance signal removing device 31 in this embodiment.

In this embodiment, the pulse compression radar apparatus 10 uses a semiconductor amplifier (not illustrated) to transmit, as shown in FIG. 2, two modulated pulse signals P0 and P1 and a non-modulated pulse signal P2. Note that waveforms of these signals are schematically shown in FIGS. 2 and 3B.

The modulated pulse signals P0 and P1 have long time widths (pulse widths), as shown in FIG. 3B, which are about tens times of the non-modulated pulse signal P2. As for the modulated pulse signals P0 and P1, modulations peculiar to the pulse compression radar apparatus 10 are performed. As shown in FIG. 2, a transmission frequency band of the modulated pulse signal P0 (a second transmission frequency band) is lower than a transmission frequency band of the non-modulated pulse signal P2 (a predetermined frequency band). On the other hand, a transmission frequency band of the modulated pulse signal P1 (a first transmission frequency band) is higher than the transmission frequency band of the non-modulated pulse signal P2. The transmission frequency band of the non-modulated pulse signal P2 is set such that it does not overlap with the transmission frequency bands of the modulated pulse signals P0 and P1 and is located between the modulated pulse signals P0 and P1.

As shown in FIG. 3B, the non-modulated pulse signal P2 has a short pulse width, and the transmission frequency band of the non-modulated pulse signal P2 is a band centering on 9410 MHz, as shown in FIG. 2. The band centering on 9410 MHz is set because a ship radar apparatus which generates transmission signals using a magnetron uses a transmission frequency band at 9410 MHz. In other words, the modulated pulse signals P0 and P1 have the transmission frequency bands of transmission signals typically transmitted from other radar apparatuses using the magnetrons.

As shown in FIG. 3B, the pulse compression radar apparatus 10 alternately transmits the non-modulated pulse signal P2 and the modulated pulse signal (either one of P0 and P1), while the modulated pulse signals P0 and P1 are selectively transmitted in a fashion described later.

The transmission trigger generator 11 generates a trigger pulse which indicates a timing to start a transmission of the series of transmission signals (i.e., a transmission timing), which is a set of the modulated pulse signal and the non-modulated pulse signal. The series of transmission signals is transmitted for every trigger pulse. The transmission trigger generator 11 can change a transmission time interval of the transmission signals to some extent by suitably varying a time interval of the trigger pulse generations.

The transmission frequency setter 12 sets the transmission frequency bands of the modulated pulse signals in accordance with the timing indicated by the trigger pulse. The transmission frequency bands are set based on a predetermined transmission frequency band pattern.

Figure 4:
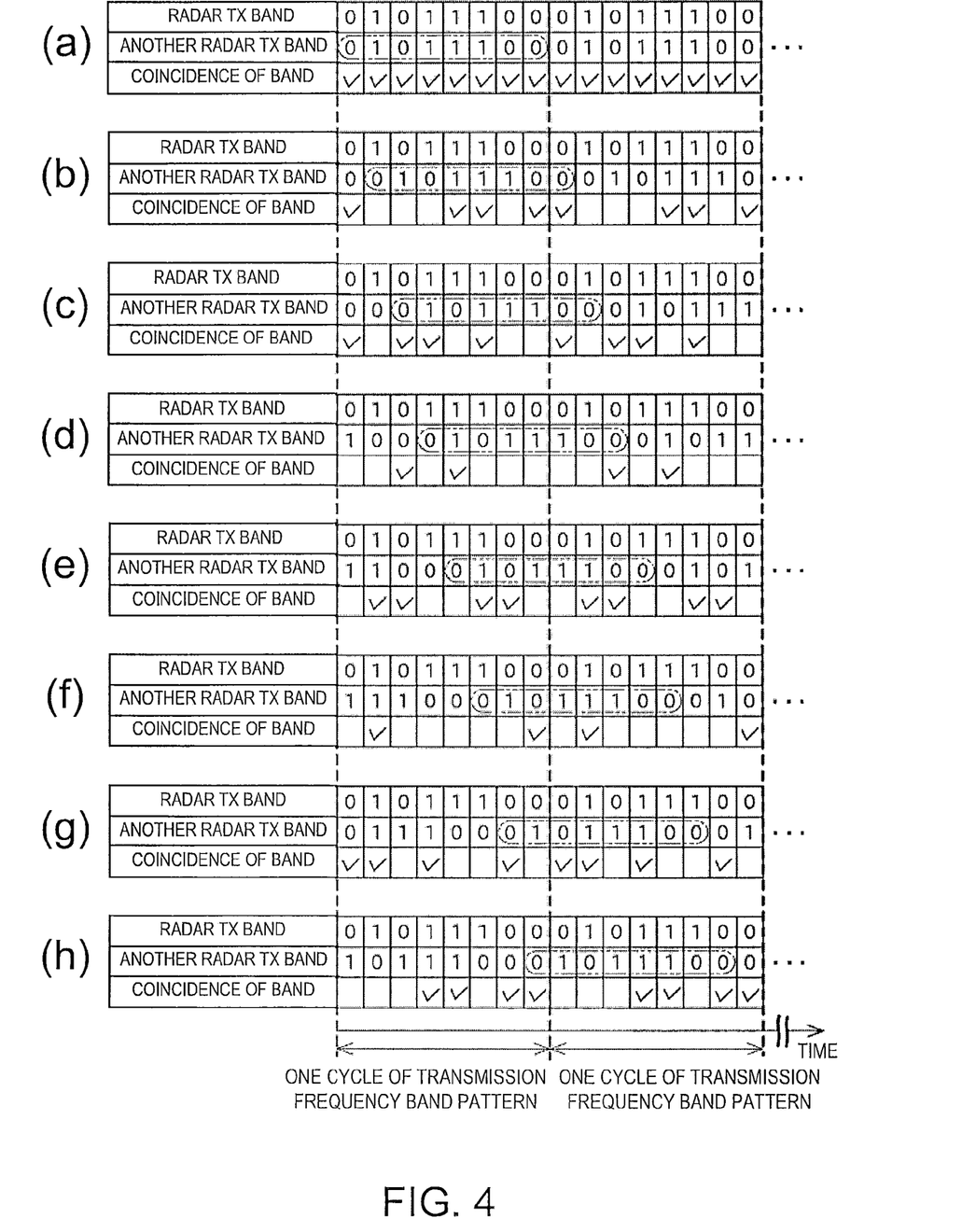
FIG. 4 shows comparing tables where the original transmission frequency band pattern is sequentially shifted by one transmission, respectively.

The transmission frequency band pattern defines how the transmission frequency bands of the modulated pulse signals are selected from two or more transmission frequency bands for every transmission of each modulated pulse signal. In this embodiment, the transmission frequency band pattern contains eight frequency bands corresponding eight transmissions of the transmission signals as one cycle, and the eight transmissions will be repeated. The transmission frequency band pattern for one cycle is shown in FIG. 3A. In FIGS. 3A and 4, "0" indicates the transmission frequency band of the modulated pulse signal P0, and "1" indicates the transmission frequency band of the modulated pulse signal P1.

In FIG. 3A, the transmission frequency band pattern is defined as an order of 0, 1, 0, 1, . . . from the left, (here, a left side value comes first and an adjacent right side value comes next in transmission). Thus, if the transmission signals of the pulse compression radar apparatus 10 are described in order of transmission, as shown in FIG. 3B, it becomes the non-modulated pulse signal P2, the modulated pulse signal P0, the non-modulated pulse signal P2, the modulated pulse signal P1, the non-modulated pulse signal P2, the modulated pulse signal P0, the non-modulated pulse signal P2, and the modulated pulse signal P1, in this order. Characteristics of this transmission frequency band pattern will be described later.

The transmission waveform generator 13 generates a waveform of each transmission signal in accordance with one of the transmission frequency bands set by the transmission frequency setter 12. When the pulse compression radar apparatus 10 transmits the modulated pulse signals P0 and P1, chirp signals of which frequencies vary gradually are generated. The waveform information is outputted to the frequency convertor 15.

The local oscillator 14 generates a local oscillation signal for converting the waveform generated by the transmission waveform generator 13 into a predetermined statutory band (i.e., a radio frequency band). The frequency convertor 15 converts, using the local oscillation signal generated by the local oscillator 14, the waveform generated by the transmission waveform generator 13 into the radio frequency band to generate the transmission signal. The transmission signal generated by the frequency convertor 15 is outputted to the antenna 16 via the transmission/reception switch 17.

The antenna 16 transmits the transmission signal to the exterior and receives the reception signal. Since the antenna 16 performs the transmission and reception while rotating horizontally, it can detect target objects in all azimuth directions around the ship.

The transmission/reception switch 17 can switch the pulse compression radar apparatus 10 between transmission and reception. More specifically, when the pulse compression radar apparatus 10 transmits the transmission signal to the exterior, the transmission signal generated by the frequency convertor 15 is outputted to the antenna 16. On the other hand, when the pulse compression radar apparatus 10 receives the reception signal, the reception signal received by the antenna 16 is outputted to the frequency convertor 18 which is described later in detail.

With the above configuration, the pulse compression radar apparatus 10 can transmit to the exterior the series of transmission signals with which the predetermined transmission frequency bands are set.

The transmission pulse outputted to the transmission/reception switch 17 from the frequency convertor 15 is outputted to the antenna 16 with minimum intensity loss. However, some other components come around to the frequency convertor 18, without being outputted to the antenna 16. These components to the frequency convertor 18 have very high intensities, compared to the echo signals from target objects. For this reason, in a case where a modulated pulse signal having a long pulse width is transmitted, a transmission of the modulated pulse signal would not be completed when an echo signal reaches the antenna 16 from a close-range target object. In this case, the echo signal from the target object is masked with the components came around to the frequency convertor 18 from the frequency convertor 15 among the intensities of the transmission pulse outputted to the transmission/reception switch 17. Therefore, the close-range target object cannot be reflected in a radar image.

In this regard, since the pulse compression radar apparatus 10 transmits the non-modulated pulse signal with the short pulse width between the two modulated pulse signals, it can receive the echo signal from the close-range target object using the non-modulated pulse signal.

The pulse compression radar apparatus 10 includes, for displaying the radar image based on the echo signal, the frequency convertor 18, a reception frequency selector 19, a matched filter 20, an interference remover 21, and an image display control unit 22. Note that the frequency convertor 18, the reception frequency selector 19, the matched filter 20, and the interference remover 21 constitute a reception signal processor 32.

The frequency convertor 18 converts the reception signal into a baseband using the local oscillation signal generated by the local oscillator 14. The reception signal converted by the frequency convertor 18 is outputted to the reception frequency selector 19.

The reception frequency selector 19 outputs only reception signals within the predetermined frequency band to the matched filter 20. Specifically, after transmitting the non-modulated pulse signal P2, only frequency components within a frequency band which contains 9410 MHz are outputted to the matched filter 20. After transmitting the modulated pulse signal P0 or P1, only frequency components within the transmission frequency band of the modulated pulse signal (P0 or P1), which is set by the transmission frequency setter 12, is outputted to the matched filter 20.

The matched filter 20 filters the reception signal inputted from the reception frequency selector 19. When the echo signal having the same modulation mode as the modulated pulse signal transmitted is included in the reception signal, since the pulse width of the echo signal is compressed by the filtering, an echo signal with a good signal-to-noise power ratio (S/N) can be acquired. The signal outputted from the matched filter 20 is inputted into the interference remover 21.

The interference remover 21 removes the interference signals from the reception signal which is outputted from the matched filter 20 (interference signal removal). The interference signal removal may be similar to the processing already described as the conventional technology where the interference remover 21 compares the reception data of adjacent sweeps at the same range and employs either one reception data with a lower signal intensity as an output value to remove an interference signal.

When focusing on the echo signal of the non-modulated pulse signal P2, interference signals other than those within the 9410 MHz band are removed by the reception frequency selector 19 from the reception signal after transmitting the non-modulated pulse signal P2. At this point, transmission signals within the 9410 MHz band transmitted from other radar apparatuses (typically, they are non-modulated pulse signals) may become interference signals in this radar apparatus, thereby causing a problem. However, these interference signals can be satisfactorily removed by the interference remover 21 performing the interference removal which is already described as the conventional technology (shown in FIG. 9A).

On the other hand, regarding echo signals of the modulated pulse signals used by common pulse compression radar apparatuses, an interference with modulated pulse signals transmitted from other radar apparatuses may also cause a problem. Since this modulated pulse signal has a long pulse width, the interference signal appears in a shape elongated in the distance direction as already described (shown in FIG. 9B). In this regard, the pulse compression radar apparatus 10 of this embodiment, however, is configured so that the transmission frequency setter 12 selects either P0 or P1 as the transmission frequency band of the modulated pulse signal based on the transmission frequency band pattern, and then outputs only components within the same transmission frequency band as the selected transmission frequency band to the matched filter 20 from the reception frequency selector 19. Therefore, when the reception data of adjacent sweeps are compared with each other at the same distance, the apparatus can prevent the interference signals from appearing continuously (this will be described later in detail). After that, the interference remover 21 outputs the reception signal after the interference removal to the image display control unit 22.

The image display control unit 22 generates a radar image based on the reception data after the interference removal which is received from the interference remover 21. The image display control unit 22 then displays the generated radar image on an external display device. Note that the radar apparatus 10 may include the display device internally.

Figure 5:
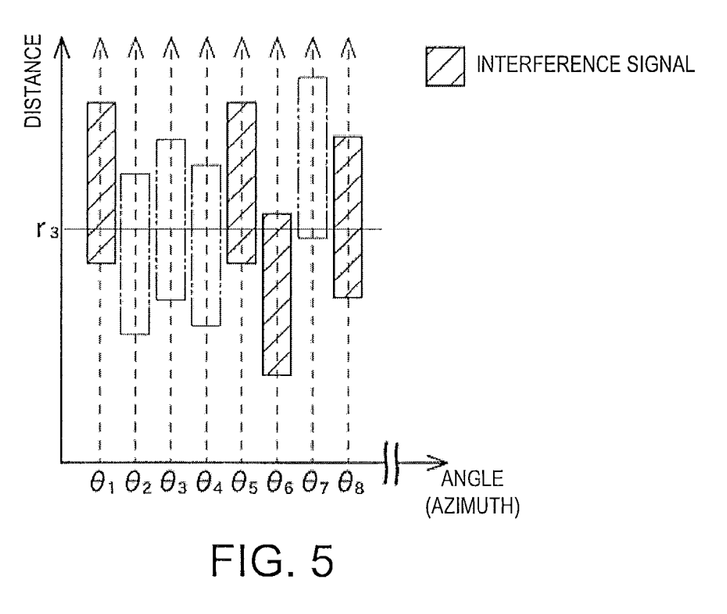
FIG. 5 is a graph showing that interference signals from another radar apparatus are removed.

Next, characteristics of the transmission frequency band pattern and a mechanism of removing the interference signals using the transmission frequency band pattern are described with reference to FIGS. 4 and 5. FIG. 4 shows comparing tables of the transmission frequency band patterns where the pattern is sequentially shifted by one transmission, respectively. FIG. 5 is a graph showing that the interference signals from other radar apparatuses are removed.

The transmission frequency band pattern of this embodiment described with reference to FIG. 3A is formed so as to remove the interference signals from other pulse compression radar apparatuses which have the same transmission frequency band pattern. Specifically, a particular transmission frequency band pattern is defined as follows. Comparison frequency band patterns are created by sequentially shifting the transmission timing of the original transmission frequency pattern, where the transmission timing varies up to seven transmissions. Thus, seven comparison frequency band patterns are created in this case. Now, the original transmission frequency band pattern is sequentially compared with the seven comparison transmission frequency band patterns. The particular transmission frequency band pattern is finally defined such that the number of continuous coincidences of the original transmission frequency band pattern and the comparison transmission frequency band patterns becomes minimum (in this embodiment, twice).

More specifically, as shown in (a) to (h) of FIG. 4, the particular transmission frequency band pattern (for two cycles) is respectively shown in a line indicated as a "(particular) radar TX band." The contents shown in respective rows correspond to each other between eight tables (a) to (h) in the vertical direction, and the top rows indicating the "radar TX band" are identical throughout the tables (a) to (h). The middle rows show the comparison transmission frequency band patterns which are sequentially shifted by one transmission, as described above, and indicated as "another radar TX band." In the middle row of "another radar TX band," one cycle of the comparison transmission frequency band pattern is surrounded with a broken chain line in order to clarify how the shifting goes. In the bottom row indicated as a "coincidence of (frequency) band," check marks are indicated at transmission points where the particular radar transmission frequency band coincides with the other radar transmission frequency band.

As seen from FIG. 4, if the pattern is shifted more than one transmission, the coincidences (with the check marks) would continuously appear no more than three times. In FIG. 4, although two repeated cycles are shown, the third cycle and subsequent cycles will bring the same results. Note that the present inventor have verified that, when one cycle of the transmission frequency band pattern contains eight transmission signals (i.e., N=8, where N is the number of transmissions) and the number of candidates of the transmission frequency bands is two (i.e., P0 and P1), the maximum number of the continuous coincidences is 2.

Therefore, if the pulse compression radar apparatus 10 and another pulse compression radar apparatus have any one of the transmission frequency band patterns of this embodiment, the transmission frequency bands of the transmission signals would not continuously coincide three times or more between the radar apparatuses, except for a case where the timing at which the transmission frequency band pattern is applied (application timing) is completely in agreement with the counterpart, as shown in (a) of FIG. 4, which occurs one eighth of probability in this case. Therefore, the reception frequency selector 19 will not output the interference signals from other radar apparatuses to the matched filter 20 continuously three times or more. This means that, when the reception data of three adjacent sweeps at the same distance are compared with each other, at least one of the reception data must not contain any interference signals. Thus, the interference signals can be removed by selecting reception data with a lower signal intensity from three sweeps as an output value.

Next, as shown in (b) of FIG. 4, a case where the application timing of the transmission frequency band pattern differs by one transmission between the radar apparatuses is particularly described.

In this case, it is assumed that the pulse compression radar apparatus 10 transmits a transmission signal corresponding to a first transmission of the transmission frequency band pattern (i.e., the non-modulated pulse signal P2 and the modulated pulse signal P0) at an angle $\theta_1$, and transmits a transmission signal corresponding to a second transmission (the non-modulated pulse signal P2 and the modulated pulse signal P1) at an angle $\theta_2$. It is also assumed that an echo signal at the angle $\theta_1$ contains the transmission signal from another pulse compression radar apparatus (the non-modulated pulse signal P2 and the modulated pulse signal P0), and an echo signal at the angle $\theta_2$ contains the transmission signal from another pulse compression radar apparatus (the non-modulated pulse signal P2 and the modulated pulse signal P0). The same is assumed for an angle $\theta_3$ and subsequent angles.

As shown in (b) of FIG. 4, the transmission frequency band of the pulse compression radar apparatus 10 and the transmission frequency band of another pulse compression radar apparatus differ when the transmission signals are transmitted at the angles $\theta_2$, $\theta_3$, $\theta_4$, and $\theta_7$. For this reason, as for the sweeps when the pulse compression radar apparatus 10 transmits at these angles $\theta_2$, $\theta_3$, $\theta_4$, and $\theta_7$, the transmission signals from another pulse compression radar apparatus can be removed by the reception frequency selector 19.

Thus, the data shown in FIG. 5 is inputted into the interference remover 21 from the matched filter 20. In FIG. 5, the interference signals removed by the reception frequency selector 19 are shown with broken chain lines.

As shown in FIG. 5, sweeps including the interference signals do not continues three times or more in the data inputted into the interference remover 21. Therefore, when reception data of three arbitrary adjacent sweeps are extracted, at least one sweep which does not contain any interference signals is included. For example, if three sweeps at angles $\theta_4$, $\theta_5$, and $\theta_6$ are observed, no interference signal is contained in the sweep at the angle $\theta_4$. Therefore, the interference signals can be removed using the reception data of the sweep at the angle $\theta_4$, for example, near a distance $r_3$, as a value of the reception data of the sweep at the angle $\theta_5$.

Note that, in order to remove the interference signals as described above, a difference more than one transmission exists in the application timing of the transmission frequency band pattern. If there is no difference as shown in (a) of FIG. 4, the interference signals cannot be removed by the reception frequency selector 19 and, thereby causing a disorder in the radar image. In this regard, the pulse compression radar apparatus 10 of this embodiment can forcibly and immediately shift the application timing of the transmission frequency band pattern, for example, by one transmission.

Therefore, since the application timing of the transmission frequency band pattern can be made different between the radar apparatuses, the interference signals can be removed by the reception frequency selector 19 to obtain a suitable radar image. The processing of shifting the application timing may be carried out, for example, in the following two cases.

First case is when a user performs a predetermined user operation. In this case, a predetermined signal is generated and it is outputted to the disturbance signal removing device 31 (in detail, to the transmission frequency setter 12). The transmission frequency setter 12 which received the signal shifts the application timing.

Second case is when provided with a configuration which detects an absence of the difference in the application timing of the transmission frequency band pattern to automatically perform the sifting. With this configuration, the disturbance signal removing device 31 is internally or externally provided with a detector. The detector detects a difference between a timing at which a transmission frequency band pattern is applied in one radar apparatus and a timing at which a transmission frequency band pattern is applied in another radar apparatus. The transmission frequency setter 12 shifts the application timing when the difference detected by the detector is zero or close to zero (less than a time length for one transmission).

Summarizing the above embodiment, the pulse compression radar apparatus 10 includes the disturbance signal removing device 31, the antenna 16, the reception signal processor 32, and the image display control unit 22. The disturbance signal removing device 31 includes the transmission trigger generator 11 and the transmission frequency setter 12. The transmission frequency setter 12 sets frequency bands to the non-modulated pulse signal P2 and the modulated pulse signals P0 and P1 each having a mutually different frequency band. The antenna 16 transmits the non-modulated pulse signal P2 and the modulated pulse signals P0 and P1, receives the reception signal caused by a reflection from a target object. The reception signal processor 32 generates a radar image showing a position of the target object around the ship based on the reception signal received by the antenna 16. The image display control unit 22 displays the radar image on an external display device.

Thus, the pulse compression radar apparatus 10 can transmit the modulated pulse signals P0 and P1, while selectively switching the transmission frequency band. Therefore, the transmission frequency bands of the modulated pulse signals P0 and P1 of the pulse compression radar apparatus 1 are difficult to coincide with a transmission frequency band of the transmission signal of another radar apparatus which does not perform the switching of the transmission frequency band. In addition, interference signals from another radar apparatus can be removed.

In the above embodiment, the transmission frequency band pattern has one cycle which spans over eight transmissions of the modulated pulse signal. The transmission frequency band pattern is defined such that, when the original transmission frequency band pattern is compared with a comparison transmission frequency band pattern of which a timing is shifted from the original transmission frequency band pattern by arbitrary number of transmissions (e.g., one to seven transmissions), transmission frequency bands of the comparison pattern continuously coincidence with the corresponding transmission frequency bands of the original pattern by a minimum number of frequency bands (e.g., twice).

Therefore, even when another radar apparatus using a similar transmission frequency band pattern exists, the number of continuous coincidences of the transmission signals will be up to twice between the radar apparatuses. Thereby, the interference signals from another radar apparatus can easily be removed by such a simple method.

FIRST MODIFICATION

Figure 6:
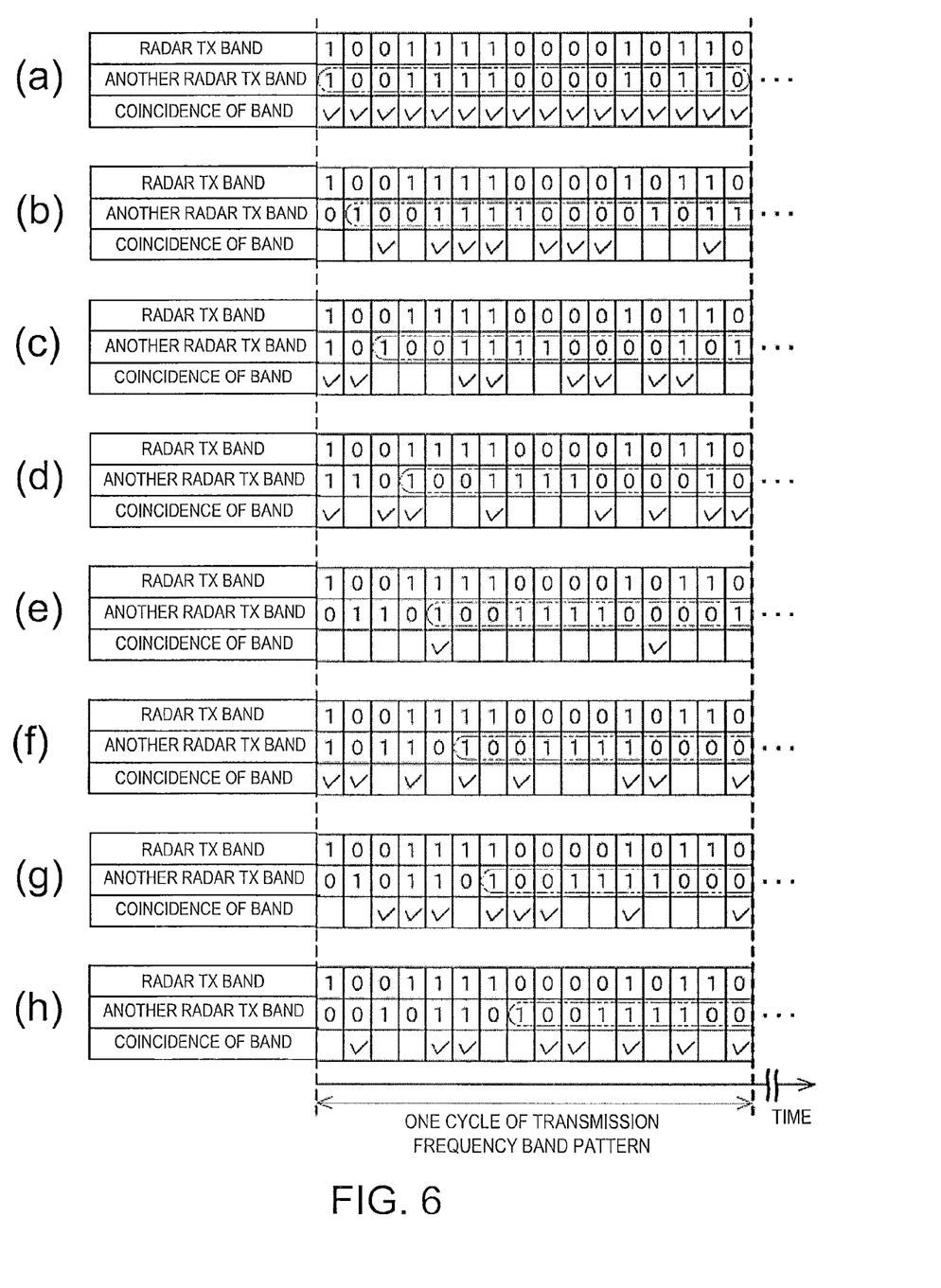
FIG. 6 shows comparing tables where the original transmission frequency band pattern is sequentially shifted by one transmission, respectively, according to a first modification of the embodiment.
Figure 7:
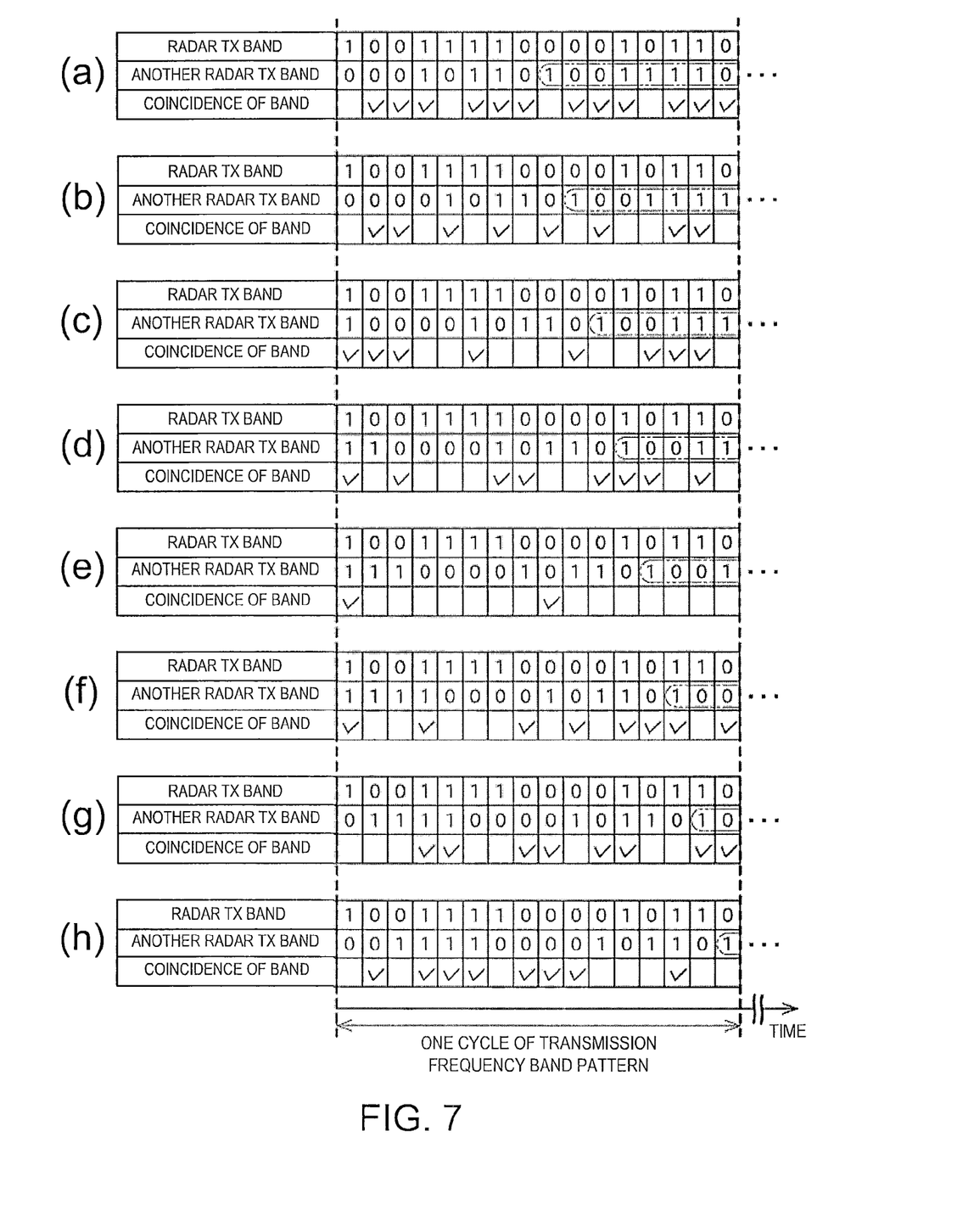
FIG. 7 shows another example of comparing tables where the original transmission frequency band pattern is sequentially shifted by one transmission, respectively, in the first modification.

Next, a first modification of the above embodiment is described with reference to FIGS. 6 and 7. In the description of the following modifications, like components identical or similar to those of the above embodiment are denoted with like reference numerals in the drawings and, thereby the description of the components may be omitted. FIGS. 6 and 7 are comparison tables where a transmission frequency band pattern is sequentially shifted by one transmission, respectively. Since FIGS. 6 and 7 are similar to FIG. 4, their detailed description is omitted.

Although the transmission frequency band pattern of the above embodiment has one cycle of eight transmissions (N=8), the transmission frequency band pattern of this modification has one cycle of sixteen transmissions (N=16). Moreover, in FIGS. 6 and 7, the tables where the original transmission frequency band pattern is sequentially shifted from zero transmission to fifteen transmissions, respectively, are shown. In the transmission frequency band patterns of this modification, coincidences of the transmission frequency band (indicated with check marks) do not continue four times or more (the number of continuous coincidences is up to three times), except for a case of (a) in FIG. 6 where the application timing of the transmission frequency band pattern is in agreement with the original pattern. Therefore, when the reception data of two or more continuous sweeps are compared at the same distance, it can prevent that interference signals (signals with high intensities) are detected continuously four times or more. The present inventor has verified that, when one cycle of the transmission frequency band pattern is sixteen transmissions of the transmission signals and the number of candidates of the transmission frequency bands is two, a minimum number of the continuous coincidences is three.

In this modification, since the interference signals may be detected continuously three times, the interference remover 21 is configured to compare the signal intensities of two sweeps before and after the sweep of interest, in addition to one sweep before or after the sweep of interest. The interference signals can be removed by using reception data with the lowest signal intensity as an output value.

Although in the above embodiment the application timings of the transmission frequency band patterns are in agreement between the radar apparatuses by ⅛ of probability, in this modification, the application timings of the transmission frequency band patterns are in agreement by 1/16 of probability. Therefore, the probability of this modification is less than that of the above embodiment.

SECOND MODIFICATION

Figure 8:
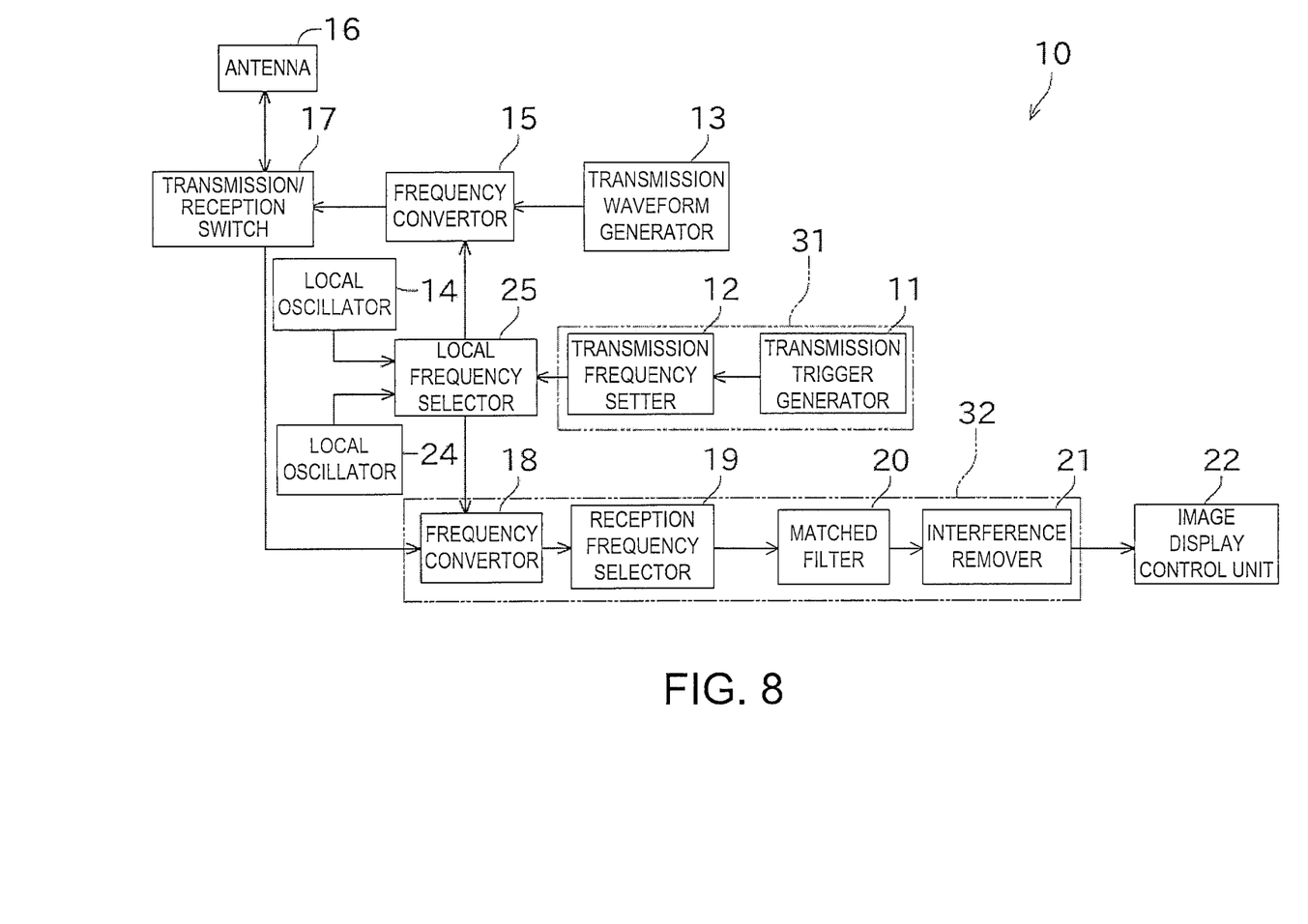
FIG. 8 is a block diagram showing a configuration of another pulse compression radar apparatus according to a second modification of the embodiment.

Next, a second modification of the above embodiment is described with reference to FIG. 8. FIG. 8 is a block diagram showing a configuration of another pulse compression radar apparatus 10 according to this modification. The pulse compression radar apparatus 10 includes, in addition to the local oscillator 14, a local oscillator 24 which generates a different local oscillation signal from the local oscillator 14. The pulse compression radar apparatus 10 also includes a local frequency selector 25 into which a first local signal generated by the local oscillator 14 and a second local signal generated by the local oscillator 24 are inputted.

A transmission frequency band which is set by the transmission frequency setter 12 is inputted into the local frequency selector 25. The local frequency selector 25 selects a local oscillation signal corresponding to the inputted transmission frequency band from the first and second local signals, and outputs it to the frequency convertor 15 and the frequency convertor 18.

Thus, a modulated pulse signal in accordance with the transmission frequency band which is set by the transmission frequency setter 12 can be generated. Switching the transmission frequency band of the modulated pulse signal may be carried out with various other configurations other than the above configuration of the above embodiment and the modifications, without limitation.

The above embodiment and modifications may further be changed or modified as follows.

The transmission frequency band pattern described above is merely illustration, and other transmission frequency band patterns may also be used as long as the transmission frequency band pattern is defined such that the number of continuous coincidences is the minimum value. For example, the transmission frequency band pattern where 1 and 0 described in the above embodiment and the first modification are exchanged may be used. Moreover, three or more transmission frequency bands may also be set for the modulated pulse signals.

The disturbance signal removing device is not limited to a configuration where the transmission frequency band is switched based on the transmission frequency band pattern defined in advance, and, for example, it may randomly select the transmission frequency band of the modulated pulse signal for every transmission (also including a pseudorandom selection).

The pulse compression radar apparatus 10 may also be applied to a radar apparatus for other usages or applications, without limiting to the application to the ship radar apparatus.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. An interference signal removing device, comprising:
   a transmission frequency setter configured to set a predetermined frequency band for a non-modulated pulse signal and to selectively set a transmission frequency band of a modulated pulse signal between a plurality of transmission frequency bands for every transmission of the modulated pulse signal, the plurality of transmission frequency bands being mutually different frequency bands that are different from the predetermined frequency band for the non-modulated pulse signal;

a transmission trigger generator configured to generate triggers for transmission of the non-modulated pulse signal and the modulated pulse signal such that at least a transmission time interval of the non-modulated pulse signal changes for every transmission of the non-modulated pulse signal; and an antenna configured to transmit the modulated pulse signal with the set transmission frequency band and to transmit the non-modulated pulse signal with the predetermined frequency band.

2. The interference signal removing device of claim 1, wherein the transmission frequency setter switches the transmission frequency band of the modulated pulse signal based on a predetermined transmission frequency band pattern.

3. The interference signal removing device of claim 2, wherein the predetermined transmission frequency band pattern is defined such that the predetermined transmission frequency band pattern has one cycle containing transmission frequency bands for N transmissions of the modulated pulse signal, and when the predetermined transmission frequency band pattern is compared with a comparison transmission frequency band pattern of which a timing is shifted from the predetermined transmission frequency band by one to N−1 transmissions, the number of continuous coincidences of the transmission frequency bands is a minimum value.

4. The interference signal removing device of claim 3, wherein the transmission frequency setter changes a timing at which the predetermined transmission frequency band pattern is applied based on a signal inputted from an external device.

5. The interference signal removing device of claim 3, wherein the transmission frequency setter changes a timing at which the predetermined transmission frequency band pattern is applied based on a detection result of a detector for detecting a difference between a timing at which the transmission frequency band pattern is applied in the interference signal removing device and a timing at which a transmission frequency band pattern is applied in another interference signal removing device.

6. The interference signal removing device of claim 2, wherein the transmission frequency setter changes a timing at which the predetermined transmission frequency band pattern is applied based on a signal inputted from an external device.

7. The interference signal removing device of claim 2, wherein the transmission frequency setter changes a timing at which the predetermined transmission frequency, band pattern is applied based on a detection result of a detector for detecting a difference between a timing at which the transmission frequency band pattern is applied in the interference signal removing device and a timing at which a transmission frequency band pattern is applied in another interference signal removing device.

8. The interference signal removing device of claim 1, wherein the transmission frequency setter randomly selects the transmission frequency band of the modulated pulse signal for every transmission.

9. The interference signal removing device of claim 1, wherein the transmission frequency setter sets a first transmission frequency band higher than a predetermined frequency band and a second transmission frequency band lower than the predetermined frequency band as the transmission frequency band for the modulated pulse signal.

10. The interference signal removing device of claim 9, wherein a band between the first transmission frequency band and the second transmission frequency band includes 9410 MHz.

11. The interference signal removing device of claim 1, wherein the transmission frequency setter alternately sets the transmission frequency band of the modulated pulse signal and the transmission frequency band of the non-modulated pulse signal.

12. The interference signal removing device of claim 1, wherein the transmission frequency setter sets any of two mutually different frequency bands as the transmission frequency band of the modulated pulse signal, wherein the non-modulated pulse signal and the modulated pulse signal are alternately transmitted; and the transmission frequency setter switches the transmission frequency band of the modulated pulse signal from one of the two frequency bands to the other.

13. The interference signal removing device of claim 1, wherein a transmission interval of the modulated pulse signal is switched.

14. The interference signal removing device of claim 1, wherein the interference signal removing device is carried in a ship.

15. A radar apparatus, comprising:

a transmission frequency setter configured to set a predetermined frequency band for a non-modulated pulse signal and to selectively set a transmission frequency band of a modulated pulse signal between a plurality of transmission frequency bands for every transmission of the modulated pulse signal, the plurality of transmission frequency bands being mutually different frequency bands that are different from the predetermined frequency band for a transmission frequency band;

a transmission trigger generator configured to generate triggers for transmission of the non-modulated pulse signal and the modulated pulse signal such that at least a transmission time interval of the non-modulated pulse signal changes for every transmission of the non-modulated pulse signal;

an antenna configured to transmit the modulated pulse signal with the set transmission frequency band and to transmit the non-modulated pulse signal with the predetermined frequency band;

a reception signal processor configured to generate a radar image indicative of a position of the target object around the radar device based on the reception signal received by the antenna; and a display controller configured to display the radar image on an external display device.

16. A method of removing an interference signal, comprising:

setting a predetermined frequency band for a non-modulated pulse signal and selectively setting a transmission frequency band of a modulated pulse signal between a plurality of transmission frequency bands for every transmission of the modulated pulse signal, the plurality of transmission frequency bands being mutually different frequency bands that are different from the predetermined frequency band the non-modulated pulse signal;

generating triggers for transmission of the non-modulated pulse signal and the modulated pulse signal such that at least a transmission time interval of the non-modulated pulse signal changes for every transmission of the non-modulated pulse signal; and transmitting the modulated pulse signal with the set transmission frequency band and transmitting the non-modulated pulse signal with the predetermined frequency band.

17. The method of claim 16, wherein the transmission frequency band of the modulated pulse signal is switched based on a predetermined transmission frequency band pattern.

18. The method of claim 17, wherein a first transmission frequency band higher than a predetermined frequency band a second transmission frequency band lower than the predetermined frequency band are set to the modulated pulse signal as the transmission frequency band for the modulated pulse signal.

19. The method of claim 16, wherein a first transmission frequency band higher than a predetermined frequency band and a second transmission frequency band lower than the predetermined frequency band are set to the modulated pulse signal as the transmission frequency band for the modulated pulse signal.

* * * * *